(No Model.) 3 Sheets—Sheet 2.
W. C. FARNUM.
TYPE WRITING MACHINE.
No. 570,159. Patented Oct. 27, 1896.
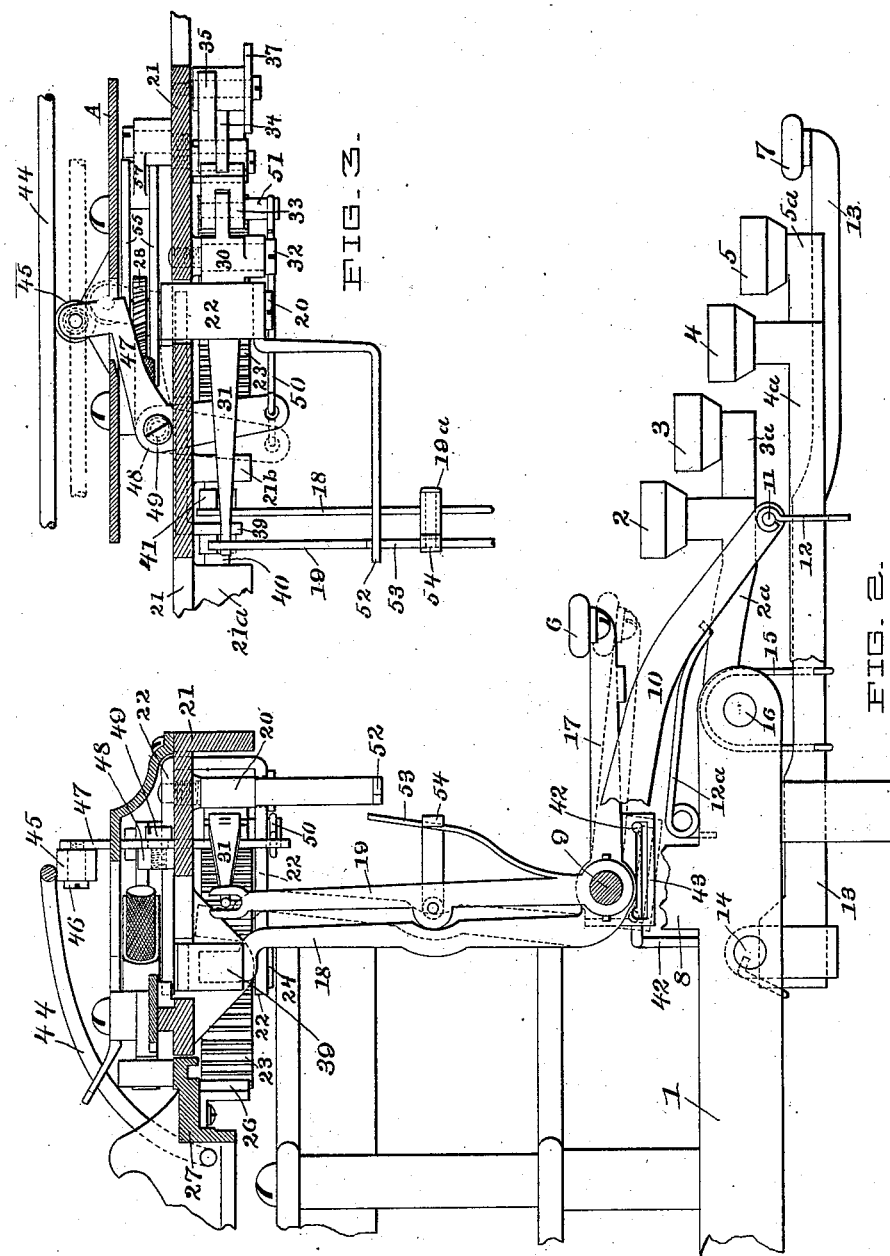
WITNESSES:
INVENTOR:
WILLIAM C. FARNUM

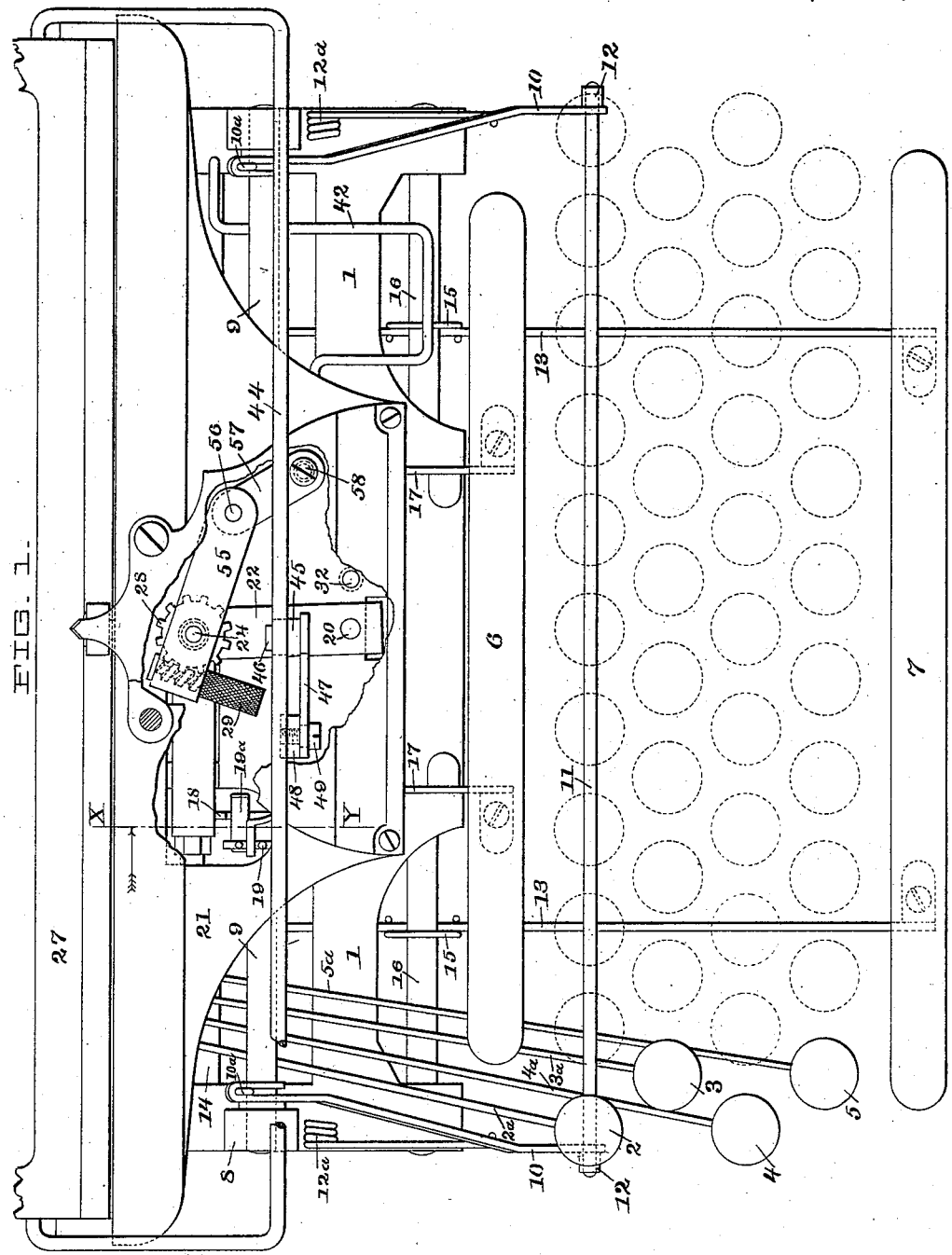

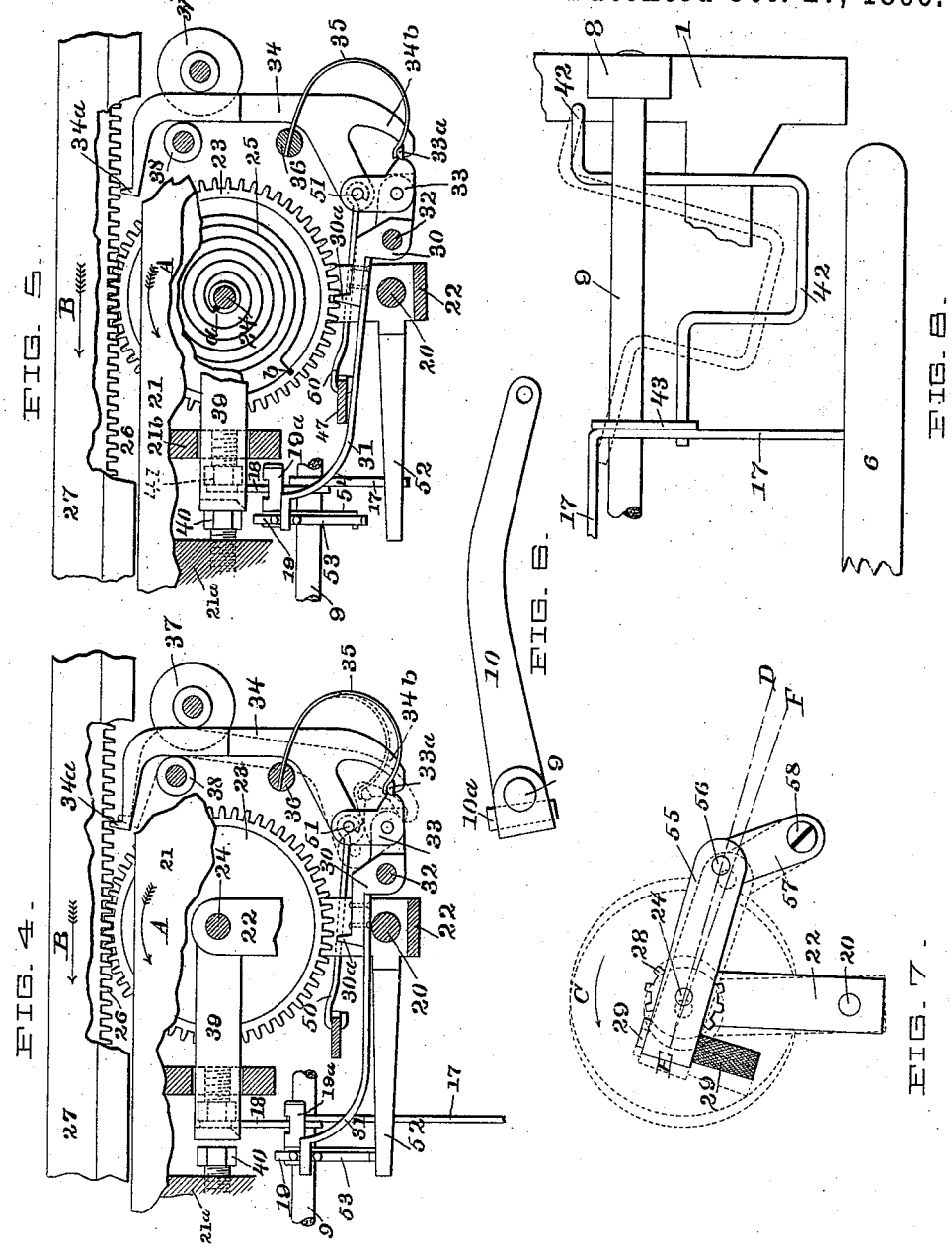

UNITED STATES PATENT OFFICE.

WILLIAM C. FARNUM, OF ARLINGTON, VERMONT.

TYPE-WRITING MACHINE.

SPECIFICATION forming part of Letters Patent No. 570,159, dated October 27, 1896.

Application filed March 19, 1895. Serial No. 542,344. (No model.)

*To all whom it may concern:*

Be it known that I, WILLIAM C. FARNUM, a citizen of the United States, residing at Arlington, in the county of Bennington and State of Vermont, have invented certain new and useful Improvements in Type-Writers, of which the following is a specification.

My invention relates to that class of typewriters in which a traveling paper-carriage is used, and has for its object the providing of suitable mechanism for moving said carriage, the same being fully illustrated in the accompanying drawings.

Of the drawings, Figure 1 is a plan view of the keyboard and a portion of the carriage of a type-writer having my improvements. Fig. 2 is a side elevation of the same, being also a partial section of the line X Y, Fig. 1. Fig. 3 is a front elevation and partial section, taken on line X Y of Fig. 1, of the driving mechanism with the frame broken away. Figs. 4 and 5 are partial plan views of the device, and Figs. 6, 7, and 8 are detail views of different parts.

Similar letters and numerals refer to similar parts throughout the several views.

The machine, partially shown in the drawings with my improvements applied, has a base-frame 1, to which are attached by their respective levers the four rows of type-keys 2, 3, 4, and 5, their corresponding levers being designated $2^a$, $3^a$, $4^a$, and $5^a$. A single-space key 7 is placed in front with a double-space key 6 in the rear of the type-keys. The space-keys 6 and 7 extend across nearly the full width of the keyboard.

A rock-shaft 9 extends across the machine and has a bearing at each end in the upright ear 8 of the base 1. The rock-shaft 9 carries at each end, inside the ears 8, an arm 10. (Shown in the plan view, Fig. 1, of which Fig. 6 is a detail showing the arm 10, a portion of the shaft 9, and the tapered key $10^a$.) This arm 10 is made of one flat piece of metal bent into a U form at the end which passes over the shaft 9. The shaft 9 is grooved across one side to receive the taper-key $10^a$, which is driven in between the shaft and the loop of the arm 10, as shown by dotted lines in Fig. 6. A rod 11 is carried at the lower ends of the arms 10 10, projecting beyond the arms at each end.

A bail 12, formed of one flat piece bent edgewise upward at each end and forming loops or eyes, is suspended upon the rod 11 with the horizontal transverse bar of this bail just beneath the key-levers of the rows 4 and 5, so that depression of any of these key-levers will cause the same to strike the bail 12 and oscillate the rock-shaft 9. The key-levers $2^a$ and $3^a$ of the rows 2 and 3 oscillate the rock-shaft 9 at each depression by striking on top of the rod 11. A spring $12^a$, attached to the base 1 and pressing underneath the arm 10, serves to return said arms and the bail and help return the key-levers to the original or normal position after being depressed.

The arms 13 of the single-shift key 7 are attached at their inner ends to a rock-shaft 14 and carry loops 15, reaching over the rod 16 and striking same at the completion of the downward stroke of the key 7, thus forming a stop. The arms 17 are mounted upon the shaft 9, so as to turn thereon, and carry at their outer ends the double-space key 6. At one side the lever 17 has attached as an integral part thereof an upright finger 18. Another upright finger, 19, forked at its upper end with a projecting pin $19^a$ midway of its height, is fixed upon the shaft 9.

It is obvious that a depression of any of the keys 2, 3, 4, and 5 or the space-key 7 will oscillate the rock-shaft 9 and therewith the finger 19. At a depression of the double-space key 6 the finger 18 swings against the pin $19^a$, as in dotted position Fig. 2, and thereby during the remainder of its swing communicates motion to the finger 19.

In Fig. 5 is shown in the same position as Fig. 2 a plan view of the parts upon which the keys, levers, and fingers aforementioned act to effect propulsion of the carriage. Side and end elevations of these parts are shown in Figs. 2 and 3. The movable carriage 27 carries a toothed rack 26, which engages with a scape-wheel 23. The wheel 23 is mounted upon a perpendicular stud 24 between the upper and lower plates of a double oscillating bracket 22, which is pivoted upon the fixed stud 20. A flat spring 25 is coiled within the scape-wheel 23 with one end fitting into a notch *a* in the stud 24 and the other end into a similar notch *b* in the inner periphery of the scape-wheel. The tension of the spring constantly tends to revolve the wheel in the direction of the arrow A and propel the carriage in the direction of the arrow B.

In Fig. 5 a tooth 30ᵃ of the dog 30, hinged upon the fixed stud 32, is shown in mesh with the teeth of the wheel 23. The tendency of the spring 25 is to roll the scape-wheel 23 upon this fixed point of contact 30ᵃ and drive the L-shaped stop-plate 39, which embraces the axial stud 24, against a stop 40, secured to a projection 21ᵃ, Fig. 3, of the plate 21, as in Fig. 5, which shows the normal position of the parts. The dog 30 is connected on the side of its pivot opposite the tooth 30ᵃ with a link 33, which forms, with a lever 34, a jointed arm or dog, for purposes hereinafter mentioned. The lever 34 is supported and guided by the rollers 37 and 38.

A depression of a type-key or the single-space key will swing the finger 19, the arm 31, and the dog 30, so as to withdraw the tooth 30ᵃ from the scape-wheel 23 and simultaneously drive the tooth 34ᵃ on the lever 34 into mesh with the carriage-rack, thereby holding said rack rigid while the type impression is made. The rack 26 now being held by the tooth 34ᵃ and the tooth 30ᵃ being withdrawn from the scape-wheel, the action of the spring 25 causes the wheel to roll upon the rack 26, thus swinging its axle-stud 24 and the bracket 22 till the downward-projecting portion of the stop-plate 39 strikes against the finger 18, through which the force of the blow is imparted to a stop 41, screwed into the ear 21ᵇ, when all the parts will stand in the position shown in Fig. 4.

A flat spring 35, Figs. 4 and 5, is held at one end by a stud 36 on the frame-plate 21, and at the other end presses upon a lip 33ᵃ of the connecting-link 33, holding it against the hooked end 34ᵇ of the lever 34, and exerting a force against both pieces to draw the dog 34ᵃ out of the rack 26 and drive the dog 30ᵃ into engagement with the scape-wheel 23. On the removal of the pressure from the depressed key the tooth 34ᵃ is withdrawn from the rack by the spring 35 and the tooth 30ᵃ reengages with the scape-wheel, entering the space next to the one it formerly occupied. The carriage being now released and free to move, the spring 25 causes the wheel to roll about the teeth 30ᵃ as a fixed point, swinging the axle 24 and bracket 22 into the position shown in Fig. 5 and propelling the carriage forward one letter-space in the direction of the arrow B.

A depression of the double-space key 6 causes a movement in the carriage equal to twice that of the other keys. A depression of the key 6 to the dotted position shown in Fig. 2 throws the finger 18 out of the path of the stop-plate 39, as shown. A double space may then be made with any of the keys, as the operation of the drum 25 and its coöperating mechanism will be the same as before described, except that the stop-plate 39 will strike against the stop 41 directly, owing to the removal of the intervening finger 18, and return to its former position, thus allowing the drum to swing through double the former distance, the tooth 30ᵃ to reëngage with the gear two spaces removed from its former space, and the carriage to travel two letter-spaces instead of one. The usual way to make a double space, however, is with one depression of the key 6, when the finger 18 strikes the pin 19ᵃ on the arm 19, as hereinbefore described, thereby operating the drum mechanism.

When it is desired to make every letter-key space doubly, it is only necessary to hold the finger 18 out of the path of the stop-plate 39. A plan of the device provided for this purpose is shown in Fig. 8. A spring 42, Figs. 8 and 2, is held and pivoted in a perpendicular hole in the frame 1. A plate 43 is attached to and forms an integral part of the double-space-key arm 17, which has a slot with a notch at each end of the upper edge thereof, as shown in Fig. 2, to receive the end of the spring 42, which exerts a constant upward pressure against the plate 43. With the spring in the normal position shown in Fig. 8 this upward pressure is applied in front of the shaft 9 and holds the arms 17 and the finger 18 in the elevated or normal position shown in Fig. 2. If the spring 42 is swung around till its end rests in the notch at the opposite end of the slot, as shown in dotted lines, Fig. 8, and behind the shaft 9, a pressure is exerted by the spring to throw the finger 18 and arms 17 into the depressed dotted position in Fig. 2.

A bail 44 is hinged at each end to the carriage-frame 27, as shown, with a straight part extending across the machine parallel to the path of the moving carriage, the bail traveling upon a roller 45. The roller 45 is carried on the stud 46 at the upper end of a bell-crank lever 47, which is supported upon a fixed fulcrum-stud 49. At its lower end the bell-crank lever is connected by a rod 50 to the bottom end of the pin 51, which connects the link 33 with the lever 34. The depression of the bail 44 turns the bell-crank lever into the dotted position in Fig. 3, which swings the link 33 over against the flat face provided therefor in the dog 30 and draws the tooth 30ᵃ of dog 30 out of engagement with the scape-wheel, when the dog 30 stands as in Fig. 4 and the link 33 and lever 34 as in dotted lines in the same view, compressing the spring 35, as shown. Both retaining-teeth being thus removed, the carriage may be returned to the right-hand side of the machine by the hand already pressing upon the bail, at the same time winding up the spring 25 inside the scape-wheel. On releasing the pressure on the bail 44 the dogs return to the normal position in Fig. 6. The carriage is thus released for movement in either direction. The carriage may also be returned to the right-hand side of the machine by simply pushing it, without releasing the teeth. When this is done, the tooth 30ª of the dog 30 will simply drag over the teeth of the scape-wheel. The finger 19 has a spring 53 attached to the edge nearest the keyboard, which is held under tension by a guide 54, attached to the pin 19ª.

An arm or finger 52, which is a part of the lower arm of the oscillating arm 22 and projects outwardly at right angles thereto, is adapted to strike against and further compress the spring 53. The spring 53 is so held that at the depression of a key the spring will swing against the edge of the arm 52, so that the movement of arm 52 when the arm 22 oscillates is utilized to store up energy in the spring 53. The energy thus transferred from the coiled spring 25 to the flat spring 53 is expended on the removal of the key-pressure in overcoming the inertia of the finger 18 and the connected key mechanism to aid their return to their normal positions.

A worm-wheel 28, Fig. 1, is mounted upon the top end of the axial stud 25 between the two plates of a U-shaped lever or link 55. The closed end of the link 55 passes around and forms a bearing for a worm-screw 29, which meshes with the worm-wheel 28. The worm-wheel 28 is fixed upon the shaft 24, which turns freely within the link 55 when driven by the worm 29. At its open end the link 55 is hinged by a pin 56 to a single bar or link 57, which in turn is pivoted upon the fixed stud 58. The coiled escapement-spring 25 may be wound up or unwound by turning the milled head of the worm 29, which, through the worm-wheel 28, imparts the motion to the stud 24. The object of this arrangement of worms and levers is to make the spring-tension adjustable and to control the expansion of the spring 25 during the reciprocation of the scape-wheel 23, so that the expansion shall be in proportion to the amount of force required at each movement. Thus when the drum 23 swings from the normal position shown in Fig. 5 out to that shown in Fig. 4 the only work to be done is to overcome the inertia of the reciprocating parts and the resistance of the spring 53. When, however, it returns to the normal position, it acts to propel the carriage forward one space, making the force required on the return stroke much greater than on the outstroke.

In Fig. 7 is shown a diagram of the parts carrying the scape-wheel in the outward position, with the normal position indicated by dotted lines, which is the same as that shown in Fig. 1, the positions of the scape-wheel being indicated by dotted circles. The coiled spring 25, being fixed at one end in the rim of the scape-wheel, exerts a force upon the wheel in the direction of the arrow C, and the other end being fixed in the stud 24 exerts a force thereupon in a direction oppositely to the arrow C. If the stud is considered as stationary and the spring 25 drives the drum in the direction of the arrow C, the spring will expand an amount proportional to the distance the drum is driven as the parts carrying the scape-wheel in the outward movement caused by the spring expansion, as hereinbefore described, pass from the dotted position to the one shown in full lines. The stud 24 will be caused to turn, by the jointed links 55 and 57, through the angle represented by the center lines D E F, in the same direction as the movement of the scape-wheel, thereby decreasing the expansion of the spring, and consequently the force exerted. On the return movement of the drum the arms 55 and 57 are returned to their normal position, turning the stud 24 back through the angle D E F and allowing increased expansion of the spring to suit the requirement of increased force to drive the carriage.

Having thus fully described my apparatus, I claim as my invention, and desire to secure by Letters Patent, the following:

1. The combination with the spring-actuated reciprocating scape-wheel, of the carriage-rack, the wheel-dog, the rack-dog and the link connecting said dogs provided with the lip which engages the rack-dog, substantially as described.

2. The combination with the spring-actuated scape-wheel and its reciprocating arm of the rack, the wheel-dog 30, the rack-dog 34, the link 33 and the spring 35, substantially as described and for the purposes set forth.

3. The combination with the scape-wheel and its coiled operating-spring of the carriage actuated thereby, an oscillating device in which the said scape-wheel is mounted, an additional spring and means connected with the keys for moving it into position to be struck and put under tension by an attachment of the said oscillating device when a key is depressed, the latter spring aiding in restoring the key-actuated devices to their normal position when the pressure on the key is withdrawn substantially as set forth.

4. The combination with a reciprocating scape-wheel of an operating-spring coiled therein and secured at one end to the scape-wheel stud, a link 55 secured to the said stud, a fixed stud 58 and a link 57 pivoted thereon and hinged to the link 55, substantially as described.

5. The combination with the platen-carriage of a type-writer, of the scape-wheel the rack engaging with the cog of said scape-wheel, the coiled operating-spring the axial stud, the worm-wheel fixed upon the axial stud and the worm engaging the worm-wheel, substantially as specified.

6. The combination with the scape-wheel of the coiled operating-spring, the axial stud the worm-wheel 28 fixed upon said stud, the link 55 the worm-screw journaled therein and the pivoted link 57, substantially as described and for the purposes set forth.

7. The combination with the swinging bail 44 hinged upon the moving carriage of the bell-crank lever 48, the connecting-rod 50 the pivot-pin 51, the link 33 and the dogs 30 and 34 arranged to be withdrawn by a depression of the bail and bell-crank lever, substantially as described.

8. A crank-arm formed of one flat bar bent upon itself at one end, in combination with a shaft fitted with a key-seat passing through the doubled end, and a key driven between the seating of the shaft and the loop of the arm, substantially as described and for the purposes set forth.

9. In a type-writer a key-spring as 42 pressing against a rocking key-lever and arranged to be swung about an axis perpendicular to the fulcrum of the key-lever in combination with a slot in the key-lever having notches for holding the spring on either side of the fulcrum the said spring engaging directly therewith, substantially as shown and for the purposes set forth.

In testimony whereof I have hereto subscribed my name this 16th day of March, 1895.

WILLIAM C. FARNUM.

In presence of—
FRANKLIN SCOTT,
EMILY SCOTT.